Oct. 17, 1944.  C. L. HOWSE  2,360,498
DEDUSTING DEVICE
Filed May 14, 1942
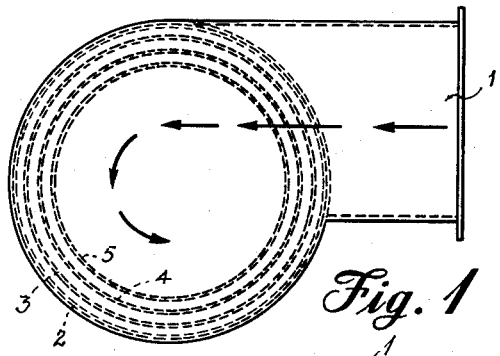
Fig. 1
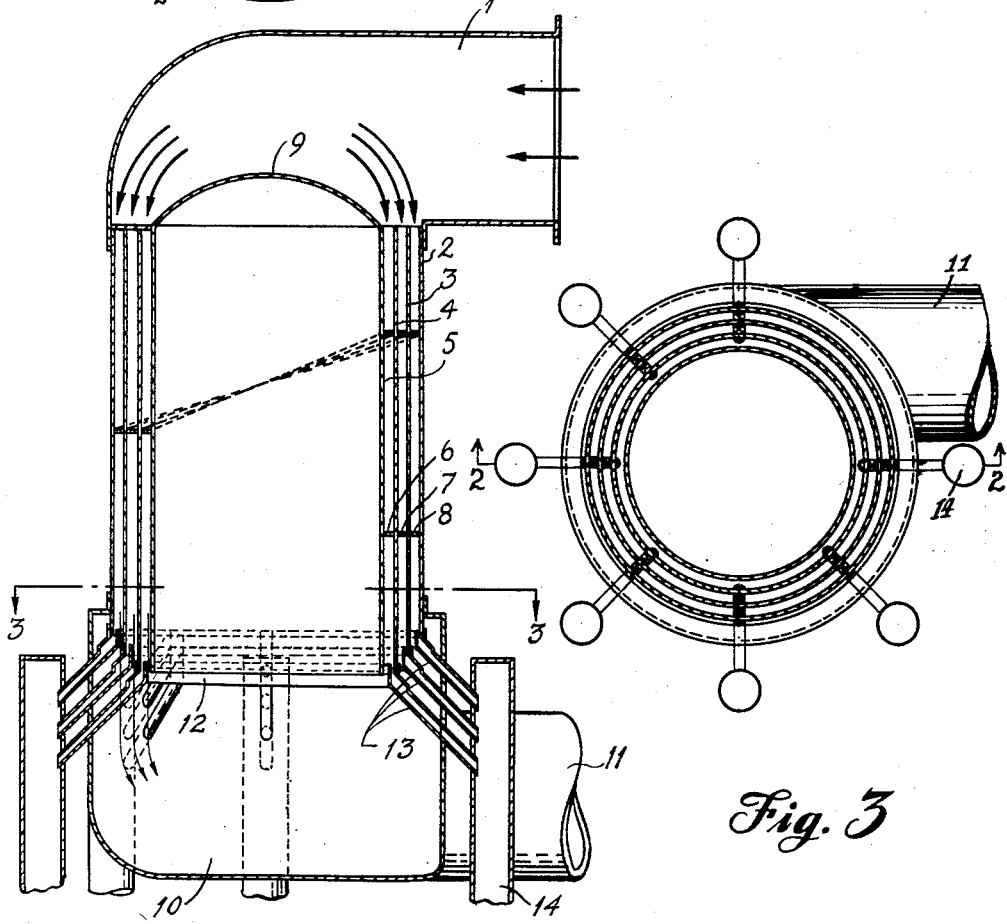
Fig. 2
Fig. 3
INVENTOR.
CURTIS L. HOWSE
BY
ATTORNEY.

Patented Oct. 17, 1944

2,360,498

UNITED STATES PATENT OFFICE 2,360,498

DEDUSTING DEVICE

Curtis L. Howse, Birmingham, Mich., assignor to Diamond Power Specialty Corporation, Detroit, Mich., a corporation of Michigan Application May 14, 1942, Serial No. 442,900

2 Claims. (Cl. 183—82)

This invention relates to removal of solid particles from a stream of gases and has for its object an improved construction of greater efficiency which is easy to manufacture and to install and which can be readily adapted to the space limitations of the conventional power plant or furnace installation. One example of the use to which my invention is adapted is to remove the major particles of the solids from the combustion gases of power plant boilers before their release into the atmosphere in order to avoid creating a nuisance in the neighborhood.

A specific object is to provide a dust catcher of the dry type employing the principle of removal by centrifugal force, the necessary centrifugal force being supplied by the gases themselves as they change direction while passing through said dust catcher.

Another object is to provide a dust catcher of the type described in which a drastic pressure drop through the equipment is avoided by dividing the stream of gases into comparatively narrow bands. The solid particles do not have to traverse a large proportion of the gas passages and therefore reach the boundaries of the gas streams quickly.

Other objects and advantages will become hereinafter more fully apparent as reference is had to the accompanying drawing wherein my invention is illustrated and in which Figure 1 is a top plan view of my improved deduster, Figure 2 is a vertical diametric section of the deduster, and Figure 3 is a horizontal section taken along the line 3—3 of Figure 2.

More particularly the numeral 1 refers to a gas duct for conducting gases containing undesirable solids to the top of the deduster equipment. The deduster equipment comprises, among other things, a plurality of spaced concentric tubes 2, 3, 4 and 5 and it will be noted that the passage 1 connects into the top of these tubes in an off-center relation so as to give the gases a directional effect as they enter the bundle of tubes. Also, the passage 1 is normal to the bundle of tubes.

The tube 2 is the outer casing of the deduster proper and connects directly to the duct 1 by a gas tight joint 6. The other tubes contained within the tube 2 are successively smaller and are maintained in equally symmetrically spaced relation by the elements 6, 7 and 8 respectively. These elements act not only as spacers but as guides for the gases. They follow a spiral course as indicated in dotted lines in Figure 2. There are no guides in the innermost tube 5 since the entry end thereof is closed by a dome-like cap 9.

The bundle of tubes rests on gas chamber 10 which provides ample space for the collection of gases leaving the tube bundle where they are led away by a flue or pipe or channel 11.

At the bottom of each space formed between the tubes 2, 3, 4, and 5 is a V-shaped channel 12, one branch of which, in each case, is secured to the outer wall of a tube 2, 3 or 4 and the other branch of which is adjacent to but spaced from an inside wall of each of these tubes.

Leading from the bottom of each of said channels 12 is a plurality of take-off or drain tubes 13 which lead into manifolds 14 for disposing of the dust collected in the channels 12.

In operation a stream of gases flow through the pipe 1 and enter the deduster off-center as seen in Figure 1, thus imparting a rotative motion to the stream. The stream flows downwardly between the tubes 2, 3, 4 and 5 in a plurality of bands, each band being guided by the baffles or spacers 6, 7 and 8 to follow a spiral course. The distance across each band is relatively small and as the gases flow downwardly of the tubes all solid particles are thrown against the outside wall of the respective bands. These solid particles eventually fall and are dragged to the bottom of the tubes where they then fall into one of the channels 12. They are then drained off through the tubes 13 and the manifolds 14 for disposal. The cleansed gases have ample room outside the channel walls to flow into the lower chamber 10 from where they are led away by the duct or flue 11. The flue 11 is disposed off-center to the deduster in the same manner as the passage 1.

I desire to be extended protection within the scope of the appended claims, wherein what I claim is:

1. An apparatus for removing solids from gases comprising a plurality of spaced concentric vertical tubes of substantially equal length and of common height, the inner one of said tubes having both ends blocked to prevent the passage of gases therethrough, means spacing said tubes from adjacent tubes consisting of a spiral transverse wall extending the length of said tubes, means forming channels encircling the inner wall of each of said tubes with the exception of the central one, each of said channels being open at the top to act as a dust collector, walled passages at spaced intervals around each of said tubes for conducting dust outwardly of the contour of said tubes, a plurality of manifolds for collecting the dust from a plurality of said passages, and a gas feed pipe arranged to direct a flow of gas tangentially and in the appropriate direction with respect to said spiral wall from above said tubes to cause a rapid spiral flow of gases through said tubes, the last named means being spaced from the adjacent inner tubes for discharging the gases from between tubes.

2. An apparatus for removing solids from gases comprising a plurality of spaced concentric vertical tubes of substantially equal length and of common height, means acting as braces and as spacers for said tubes consisting of a spiral transverse wall between each of said tubes and the adjacent tubes spiralling the length thereof, means blocking the inlet end of the central one of said tubes, dust collecting means adjacent the inside surface of the outlet end of each of said tubes, conduit means feeding gases into the upper end of said tubes, a gas compartment below said tubes for receiving the gases therefrom, conduit means conducting away the gases from said compartment, and dust conduits leading from said dust collecting means through the walls of said compartment.

CURTIS L. HOWSE.